United States Patent
Presche

(10) Patent No.: US 9,902,538 B2
(45) Date of Patent: Feb. 27, 2018

(54) ADMIXING CLOSURE DEVICE FOR A CONTAINER

(71) Applicant: RPC Bramlage GmbH, Lohne (DE)

(72) Inventor: Martin Presche, Dinklage (DE)

(73) Assignee: RPC Bramlage GmbH, Lohne (DE)

( * ) Notice: Subject to any disclaimer, the term of this patent is extended or adjusted under 35 U.S.C. 154(b) by 0 days.

(21) Appl. No.: 15/307,522

(22) PCT Filed: May 6, 2015

(86) PCT No.: PCT/EP2015/059902
§ 371 (c)(1),
(2) Date: Oct. 28, 2016

(87) PCT Pub. No.: WO2015/169822
PCT Pub. Date: Nov. 12, 2015

(65) Prior Publication Data
US 2017/0050784 A1    Feb. 23, 2017

(30) Foreign Application Priority Data

May 7, 2014   (DE) .................. 10 2014 106 369
May 28, 2014  (DE) .................. 10 2014 107 550

(51) Int. Cl.
*B65D 51/28*    (2006.01)
*B29C 45/14*    (2006.01)
(Continued)

(52) U.S. Cl.
CPC .... *B65D 51/2864* (2013.01); *B29C 45/14467* (2013.01); *B65D 51/2892* (2013.01);
(Continued)

(58) Field of Classification Search
USPC ................ 206/219, 221; 215/DIG. 8, 227
See application file for complete search history.

(56) References Cited

U.S. PATENT DOCUMENTS 3,356,263 A    12/1967  Monroe
6,321,908 B1 * 11/2001  Lorscheidt ......... B65D 81/3211
                                                    206/221
(Continued)

FOREIGN PATENT DOCUMENTS

DE    1 704 038 A1    5/1971
DE    25 01 291 A1    7/1976
(Continued)

OTHER PUBLICATIONS

Wikipedia: "Polybutylene terephthalate", XP002743484, Retrieved from the Internet: URL:https:/en.wikipedia.org/wiki/Polybutylene_terephthalate, Retrieved on Dec. 22, 2016, total of 2 pages [Wikipedia: "Polybutylenterephthalat" originally retrieved on Aug. 19, 2015 from URL:https://de.wikipedia.org/wiki/Polybutylenterephthalat].
International Search Report of PCT/EP2015/059902, dated Sep. 14, 2015.

*Primary Examiner* — Jacob K Ackun
(74) *Attorney, Agent, or Firm* — Collard & Roe, P.C.

(57) ABSTRACT

A closure device for a container comprising a cover element for closing the container, a chamber arranged on the cover element and an inner housing. The chamber has a chamber end piece having an outlet opening that can be closed by means of a closure means. The inner housing comprises opening means for opening the outlet opening, wherein the chamber can be moved relative to the inner housing from a closed position into an outlet position. The chamber and the chamber end piece are connected to each other in a fluid-tight and gas-tight manner by means of a plastic seal injection molded on chamber and chamber end piece, wherein chamber, chamber end piece and plastic seal are formed from the same plastic. The invention further relates to a method for producing a closure device or a chamber.

10 Claims, 3 Drawing Sheets

(51) Int. Cl.
*B29K 67/00* (2006.01)
*B29K 667/00* (2006.01)
*B29L 31/56* (2006.01)

(52) U.S. Cl.
CPC .. *B29K 2067/006* (2013.01); *B29K 2667/006* (2013.01); *B29L 2031/565* (2013.01)

(56) References Cited

U.S. PATENT DOCUMENTS

| | | | |
|---|---|---|---|
| 8,684,173 B2 * | 4/2014 | Otsuka | A61J 1/2093 |
| | | | 206/219 |
| 2003/0213709 A1 | 11/2003 | Gibler et al. | |
| 2006/0118435 A1 * | 6/2006 | Cronin | B65D 47/243 |
| | | | 206/219 |
| 2009/0236244 A1 | 9/2009 | Frutin | |
| 2012/0074001 A1 * | 3/2012 | Genosar | A61J 1/2089 |
| | | | 206/219 |
| 2012/0279939 A1 * | 11/2012 | Lee | B65D 51/28 |
| | | | 215/227 |
| 2015/0239638 A1 * | 8/2015 | Lee | B65D 51/285 |
| | | | 206/222 |

FOREIGN PATENT DOCUMENTS

| | | |
|---|---|---|
| EP | 0 064 310 A2 | 11/1982 |
| EP | 1 974 886 A1 | 10/2008 |
| WO | 2007/129116 A1 | 11/2007 |
| WO | 2012/175934 A2 | 12/2012 |

* cited by examiner

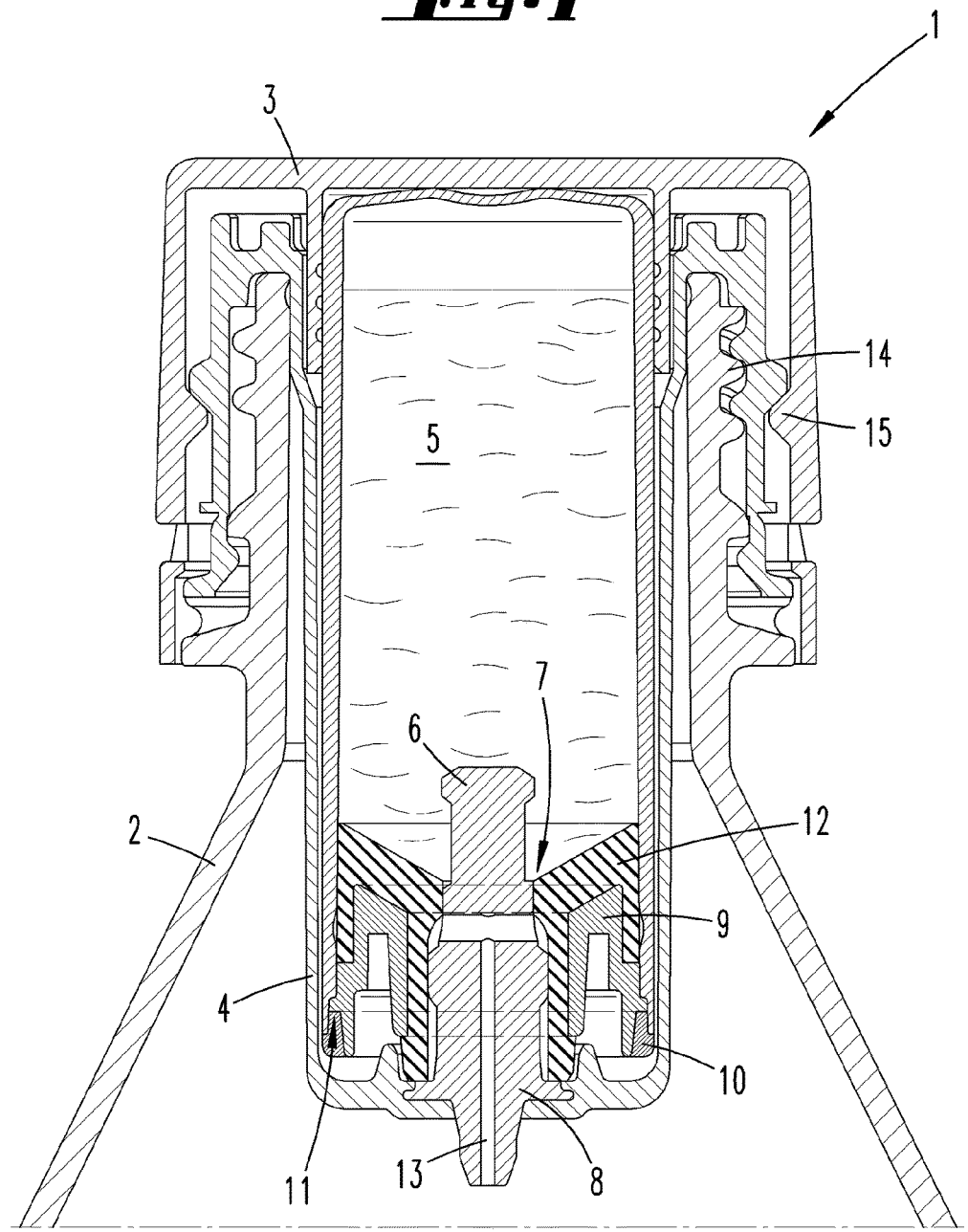

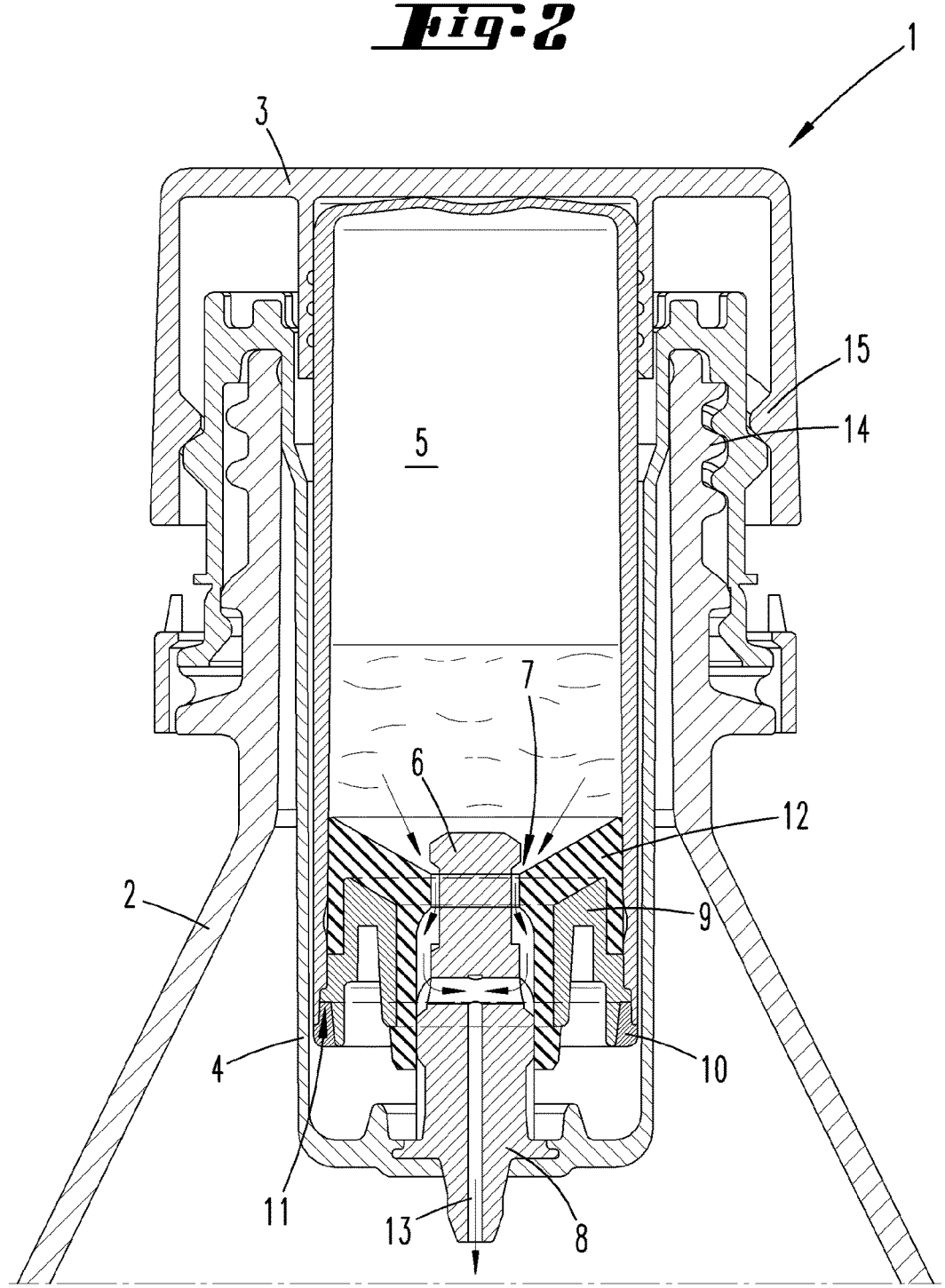

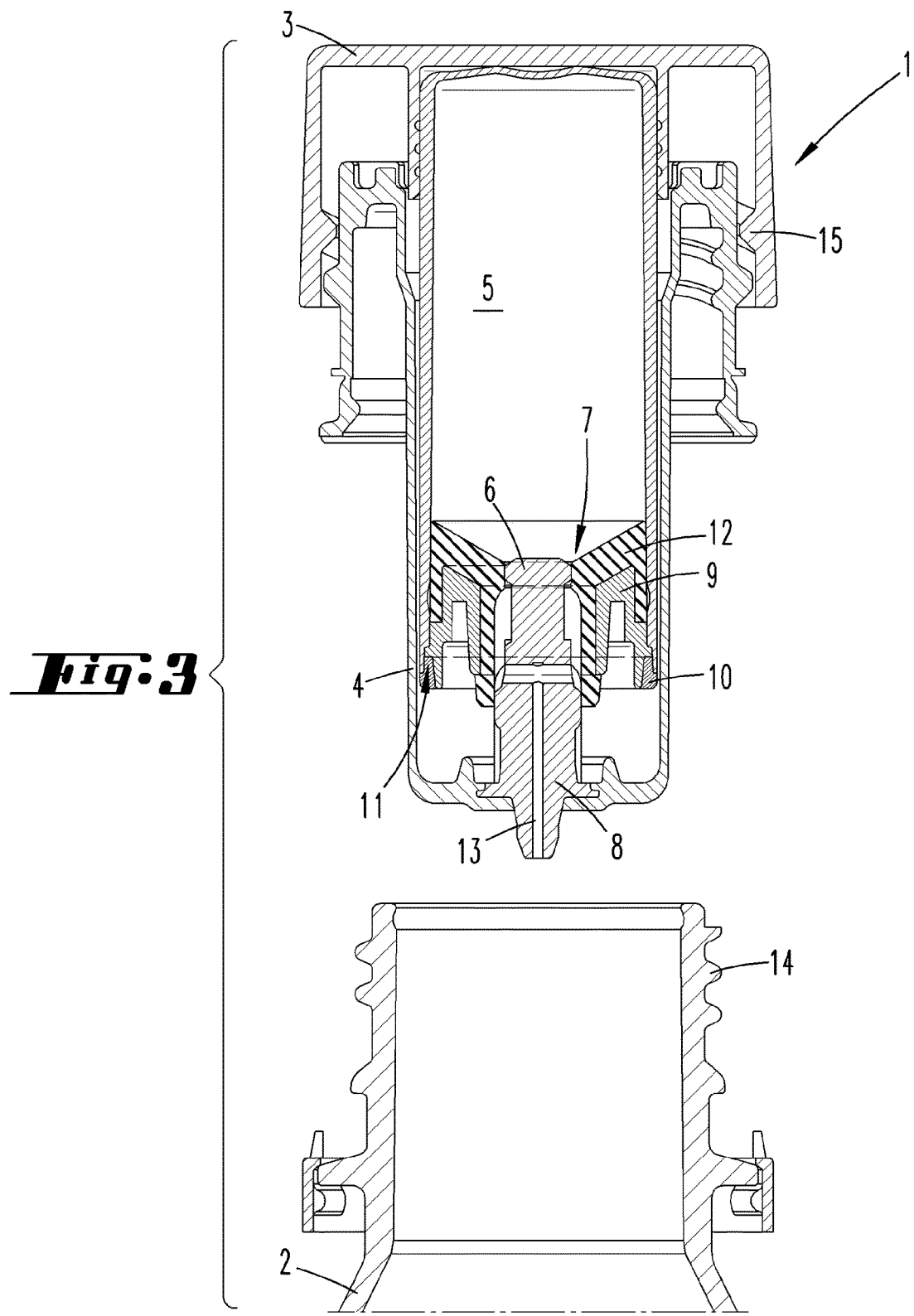

ADMIXING CLOSURE DEVICE FOR A CONTAINER

CROSS REFERENCE TO RELATED APPLICATIONS

This application is the National Stage of PCT/EP2015/059902 filed on May 6, 2015, which claims priority under 35 U.S.C. § 119 of German Application No. 10 2014 106 369.4 filed on May 7, 2014 and German Application No. 10 2014 107 550.1 filed on May 28, 2014, the disclosures of which are incorporated by reference. The international application under PCT article 21(2) was not published in English.

The invention pertains to a closure device for a container, particularly a beverage bottle, wherein the closure device features a cover element for closing the container, a chamber arranged on the cover element and an inner housing, wherein the chamber features a chamber end piece with a discharge opening that can be closed with the aid of a closing means, wherein the inner housing features an opening means for opening the discharge opening and the chamber can be moved relative to the inner housing from a closed position into a discharge position, and wherein a discharge channel between the chamber and the container is released in the discharge position such that a medium stored in the chamber can escape into the container.

Closure devices of the aforementioned type are known from the prior art. These closure devices—as well as the container—are usually made of polyethylene (PE) or a polypropylene (PP). Such closure devices serve for closing a container, for example a beverage bottle, and for simultaneously providing a chamber for the separate storage of liquid or powdery ingredients, for example tea essences, such that these ingredients are not introduced into the container until the moment, in which the closure device is removed from the container, and thereby come in contact with and/or are mixed, e.g., with water therein. This is typically the moment, in which a user would like to consume the beverage in the container.

For example, publication WO 2007/129116 A1 concerns a closure device, in which the cover element features a wall that protrudes into the container and defines a chamber for storing the medium. The wall of this chamber is connected to a chamber end piece that encompasses the end of the chamber in the form of a plug-type connection. The chamber end piece features a discharge opening, in which a closure element arranged on an inner housing is arranged. When the cover element is unscrewed from the container, the cover element and therefore also the chamber arranged thereon are simultaneously moved away from the inner housing. The closing means within the discharge opening of the chamber end piece is thereby displaced, wherein a discharge channel is released and the medium stored in the chamber can escape into the container.

In this known closure device, it is disadvantageous that the chamber and the cover element are realized in one piece such that the walls of the chamber—as well as of the cover element—are made of PP or PE. However, these plastics do not form a sufficient barrier against gases such as oxygen or carbon dioxide. In addition, the production of the known cover element is relatively time-consuming and costly.

WO 2012/175934 A2 concerns a closure device featuring a cover element and a chamber arranged thereon. The material of the cover element is injection-moulded around the chamber. This injection-moulding process is likewise material- and time-consuming because the material of the cover element has to be injection-moulded around the chamber up to the chamber end piece in order to ensure the desired tightness, i.e. barrier properties, of the chamber against gases such as, for example, oxygen and carbon dioxide.

The invention therefore is based on the objective of developing a closure device, in which the chamber and the chamber end piece can be connected to one another quickly, cost-effectively and, in particular, in a fluid-tight and gas-tight fashion.

To this effect, the invention proposes a closure device according to the preamble of claim 1, in which the chamber and the chamber end piece are connected to one another in a fluid-tight and gas-tight fashion by means of a plastic seal that is injection-moulded on the chamber and the chamber end piece, wherein the chamber, the chamber end piece and the plastic seal are made of the same plastic.

According to the invention, the chamber, the chamber end piece and the plastic seal can now be produced in the form of a unit independently of the cover element. This provides the additional advantage that a plastic, which differs from the material of the cover element, particularly has a higher density, and/or offers a suitable barrier, for example, against oxygen and carbon dioxide, can be chosen as material for the chamber, the chamber end piece and the plastic seal. Due to the plastic seal injection-moulded thereon, the chamber and the chamber end piece can now be directly produced of a fluid-tight and gas-tight material such that it is not necessary to provide an additional seal or an additional reinforcement, for example in the form of large-surface injection-moulding with the material of the cover element. This is also particularly advantageous if the filled chamber is pressurized relative to the surroundings as preferred. This overpressure can be suitably achieved by means of a gas cushion.

The chamber can advantageously be completely prepared for the installation on the cover element in a preceding production step. The chamber particularly can initially be prepared with the chamber end piece and, if applicable, other sealing elements. An additional sealing element (rubber seal) arranged, for example, between the chamber and the chamber end piece and/or between the chamber end piece and the discharge opening, i.e. the closing means, particularly can also be preinstalled. Due to the subsequent injection-moulding of the inventive plastic seal on the chamber and the chamber end piece, these two components are connected to one another in a fluid-tight and gas-tight fashion and form an integral chamber unit, which as such can be connected to the cover element in another production step. Due to the injection-moulding of the inventive plastic seal on the chamber and the chamber end piece, these two components are at least partially softened such that a fluid-tight and gas-tight connection between the chamber, the plastic seal and the chamber end piece is produced.

According to the invention, the chamber, the chamber end piece and the plastic seal are made of the same plastic, preferably a thermoplastic polymer. It is particularly proposed that the plastic has a density between 1.1 $g/cm^3$ and 1.5 $g/cm^3$, preferably between 1.20 $g/cm^3$ and 1.45 $g/cm^3$. The plastic may particularly consist of polybutylene terephthalate (PBT). The use of polyethylene terephthalate (PET) would alternatively also be conceivable. Since the chamber and the chamber end piece, as well as the plastic seal, are made of the same plastic, these components can be very easily connected to one another by simply injection-moulding the plastic seal on the chamber and the chamber end piece. The injection-moulding process also softens at least parts of the chamber and the chamber end piece such that a fluid-tight and gas-tight welded connection is produced due to the subsequent cooling of the plastic. The chosen plastic advantageously consists of polybutylene terephthalate (PBT), which is typically used as material for the chamber in the prior art. This material is used, in particular, in order to ensure the required barrier effect against gases such as oxygen and carbon dioxide. The chamber end piece can now also be made of PBT such that this component does not represent a leak for fluids or gases. Furthermore, the injection-moulded plastic seal additionally increases the tightness and simultaneously also reinforces the mechanical connection between the chamber and the chamber end piece—in addition to the plug-type connection.

It is furthermore proposed that the chamber is realized cylindrically, wherein the chamber end piece and the plastic seal are essentially realized annularly. This type of geometric design makes it particularly easy to adapt the inventive closure device to a cylindrical container such as, for example, a beverage bottle. In this case, the chamber end piece is realized annularly and forms a central discharge opening. The plastic seal is likewise realized annularly such that it can be attached to the chamber end piece and the chamber in a form-fitting fashion.

It is ultimately proposed that the chamber end piece is inserted into the chamber in a form-fitting fashion on the end of the chamber, wherein a gap for the arrangement of the plastic seal is formed between the chamber and the chamber end piece. The wall of the chamber, as well as the chamber end piece, may in this case be shaped in such a way that their facing surfaces are not completely in contact with one another, but rather feature, for example, specially shaped end regions that form a gap between one another. The material for forming the plastic seal can be injected into this gap such that the contact surface between the plastic seal and the chamber and between the plastic seal and the chamber end piece is respectively increased. In this way, the mechanical stability and the tightness of the connection between the chamber and the chamber end piece are additionally increased.

In addition to the above-described closure device, the invention also proposes a chamber featuring a chamber end piece with a discharge opening that can be closed with the aid of a closing means, wherein the chamber and the chamber end piece are connected to one another in a fluid-tight and gas-tight fashion by means of a plastic seal that is injection-moulded on the chamber and the chamber end piece, and wherein the chamber, the chamber end piece and the plastic seal are made of the same plastic. The proposed chamber is particularly intended for a closure device of the above-described type. This inventive chamber forms a preassembled integral unit, which as such can be connected to the remaining components of the closure device, particularly of the cover element. The chamber is advantageously realized cylindrically, wherein the chamber end piece and the plastic seal are essentially realized annularly. The invention ultimately also proposes a chamber, in which the chamber end piece is inserted into the chamber in a form-fitting fashion, wherein a gap for the arrangement of the plastic seal is formed between the chamber and the chamber end piece.

In addition to the above-described objects, the invention also proposes a method for producing a closure device or a chamber, wherein said method includes the following steps:
supplying a chamber,
supplying a chamber end piece that is made of the same plastic as the chamber,
inserting the chamber end piece into an end region of the chamber in a form-fitting fashion, and
injection-moulding a plastic seal on the chamber and the chamber end piece, wherein the plastic seal is made of the same material as the chamber and the chamber end piece such that the chamber and the chamber end piece are connected to one another in a fluid-tight and gas-tight fashion.

It is furthermore proposed that the plastic seal is injected into a gap formed between the chamber and the chamber end piece.

The invention is described in greater detail below with reference to an exemplary embodiment. In the drawings:

FIG. 1 shows an inventive closure device with a plastic seal, which is injection-moulded on the chamber and the chamber end piece, in a closed position, FIG. 2 shows the closure device according to FIG. 1 in a discharge position, and FIG. 3 shows the closure device according to FIG. 1 in a position, in which it is completely separated from a container.

The closure device 1 illustrated in FIG. 1 is already screwed on a container 2 in a preassembled fashion. The container 2 consists, for example, of a conventional plastic beverage bottle.

The closure device 1 features a cover element 3, a chamber 5 arranged on the cover element 3 and an inner housing 4 arranged on the container 2. The container 2 is connected to the inner housing 4 by means of a first pair of threads 14. The inner housing 4 is in turn connected to the cover element 3 by means of a second pair of threads 15. The chamber 5 is arranged on the cover element 3, for example, by means of a clamping connection, wherein the material of the cover element 3 only extends over part of the total length of the chamber 5. In the present example, the material of the cover element 3 covers approximately one-fifth of the total length of the sidewall of the chamber 5.

An opening means 8 and a closing means 6 are arranged on the inner housing 4, wherein the opening means 8 and the closing means 6 are realized in the form of an integral plug element in this exemplary embodiment. This plug element protrudes into a discharge opening 7 of the chamber 5. According to this embodiment, the opening means 8 is connected to the inner housing 4 in that the material of the inner housing 4 is partially injection-moulded over an edge region of the opening means 8.

The chamber 5 features a chamber end piece 9, which is realized annularly and provides a discharge opening 7, on its end region that faces away from the cover element 3. An additional sealing element 12 such as, for example, a rubber seal or a seal of a polymer with rubber-like properties, particularly nitrile, is arranged between the chamber end piece 9 and the closing means 6 of the plug element protruding into the discharge opening 7, wherein said sealing element either seals or releases the discharge opening 7 in connection with the closing means 6 depending on the position of the closing means 6. In the closed position shown, a projection of the closing means 6, which closes the discharge opening 7 in a fluid-tight and gas-tight fashion, is located within the narrowest cross section of the discharge opening 7.

With respect to the production of the closure device 1 shown, it is advantageous to initially produce a preassembled unit consisting of a chamber 5, a chamber end piece 9, a plastic seal 10 and preferably also a sealing element 12. To this end, the chamber end piece is inserted into the open end region of the chamber 5 in the form of a plug-type connection. The chamber end piece 9 is preferably also connected to the sealing element 12, which seals the contact regions with the chamber 5 on the one hand and with the closing means 6 on the other hand, in a form-fitting fashion. A gap 11 is formed due to the shape of the end regions of the chamber 5 and the chamber end piece 9, wherein plastic material is injected into said gap such that a plastic seal 10 is formed. The chamber 5 and the chamber end piece 9 are at least partially melted due to the high temperature of the plastic seal 10 being injection-moulded thereon, particularly because they are made of the same material and therefore have the same melting point. A unit consisting of the chamber 5, the chamber end piece 9, the plastic seal 10 and the sealing element 12 is obtained after the plastic has cooled. This unit can now be connected to the cover element 3, for example, by means of a clamping connection.

Subsequently, the cover element 3 and the inner housing 4 are connected to one another by means of the second pair of threads 15. The thusly completed closure device 1 is then connected to the container 2. To this end, the inner housing 4 of the closure device 1 is screwed on the container 2 by means of the first pair of threads 14.

FIG. 2 shows the closure device 1 in a discharge position, i.e. after an actuation of the closure device 1. An opening motion of the closure device 1 relative to the container 2 (along the second pair of threads 15) causes the cover element 3 and therefore also the chamber 5 arranged on the cover element 3 to move away from the inner housing 4, i.e. upward in FIG. 1, such that the position of the closing means 6 within the discharge opening 7 of the chamber 5 is changed. In this case, the closing means 6 is preferably stationary and the container 2 is moved relative to the closing means 6. A discharge channel 13 within the opening means 8 is thereby released such that a medium stored in the chamber 5 can escape into the container 2. During the further unscrewing motion of the cover element 3 from the container 2, the threads formed between the cover element 3 and the inner housing 4 reach an end position, in which the cover element 3 and the inner housing 4 can no longer be turned relative to one another. Consequently, the rotational motion is continued by means of the first threads 14 formed between the inner housing 4 and the container 2 such that the closure device 1 ultimately is completely unscrewed from the container 2.

FIG. 3 shows the closure device 1 after it has been completely separated from the container 2. In this case, the closing means 6 within the discharge opening 7 is in an end position, in which the discharge opening 7 is closed by means of a correspondingly shaped end region of the closing means 6 such that subsequent dripping from the chamber 5 is prevented.

LIST OF REFERENCE SYMBOLS

1 Closure device
2 Container
3 Cover element
4 Inner housing
5 Chamber
6 Closing means
7 Discharge opening
8 Opening means
9 Chamber end piece
10 Plastic seal
11 Gap
12 Sealing element
13 Discharge channel
14 First pair of threads
15 Second pair of threads

The invention claimed is:

1. A closure device (1) for a container (2), particularly a beverage bottle,
wherein the closure device (1) features a cover element (3) for closing the container (2), a chamber (5) arranged on the cover element (3) and an inner housing (4),
wherein the chamber (5) features a chamber end piece (9) with a discharge opening (7) that can be closed with the aid of a closing means (6),
wherein the inner housing (4) features an opening means (8) for opening the discharge opening (7), and
wherein the chamber (5) can be moved relative to the inner housing (4) from a closed position into a discharge position, in which a discharge channel (13) between the chamber (5) and the container (2) is released such that a medium stored in the chamber (5) can escape into the container (2),
wherein the chamber (5) and the chamber end piece (5) are connected to one another in a fluid-tight and gas-tight fashion by means of a plastic seal (10) that is injection-moulded on the chamber (5) and the chamber end piece (9), wherein the chamber (5), the chamber end piece (9) and the plastic seal (10) are made of the same plastic.

2. The closure device (1) according to claim 1, wherein the chamber (5), the chamber end piece (9) and the plastic seal (10) are made of a thermoplastic polymer, preferably of a plastic with a density between 1.1 g/cm$^3$ and 1.5 g/cm$^3$, particularly between 1.20 g/cm$^3$ and 1.45 g/cm$^3$.

3. The closure device (1) according to claim 1, wherein the plastic is polybutylene terephthalate (PBT).

4. The closure device (1) according to claim 1, wherein the chamber (5) is realized cylindrically, wherein the chamber end piece (9) and the plastic seal (10) are essentially realized annularly.

5. The closure device (1) according to claim 1, wherein the chamber end piece (9) is inserted into the chamber (5) in a form-fitting fashion, wherein a gap (II) for the arrangement of the plastic seal (10) is formed between the chamber (5) and the chamber end piece (9).

6. A chamber (5), particularly for a closure device (1) according to claim 1, wherein the chamber (5) features a chamber end piece (9) with a discharge opening (7) that can be closed with the aid of a closing means (6), wherein the chamber (5) and the chamber end piece (9) are connected to one another in a fluid-tight and gas-tight fashion by means of a plastic seal (10) that is injection-moulded on the chamber (5) and the chamber end piece (9), wherein the chamber (5), the chamber end piece (9) and the plastic seal (10) are made of the same plastic, particularly of polybutylene terephthalate (PBT).

7. The chamber (5) according to claim 6, wherein the chamber (5) is realized cylindrically, wherein the chamber end piece (9) and the plastic seal (10) are essentially realized annularly.

8. The chamber (5) according to claim 6, wherein the chamber end piece (9) is inserted into the chamber (5) in a form-fitting fashion, wherein a gap (11) for the arrangement of the plastic seal (10) is formed between the chamber (5) and the chamber end piece (9).

9. A method for producing a closure device (1) according to claim 1, comprising the steps of:
a. supplying a chamber (5),
b. supplying a chamber end piece (9) that is made of the same plastic as the chamber (5),
c. inserting the chamber end piece (9) into an end region of the chamber (5) in a form-fitting fashion, and d. injection-moulding a plastic seal (10) on the chamber (5) and the chamber end piece (9), wherein the plastic seal (10) is made of the same plastic as the chamber (5) and the chamber end piece (9) such that the chamber (5) and the chamber end piece (9) are connected to one another in a fluid-tight and gas-tight fashion.

10. The method according to claim 9, wherein the plastic seal (10) is injected into a gap (11) formed between the chamber (5) and the chamber end piece (9).

\* \* \* \* \*